United States Patent [19]

Lehto

[11] Patent Number: 5,045,112

[45] Date of Patent: Sep. 3, 1991

[54] COGENERATION PROCESS FOR PRODUCTION OF ENERGY AND IRON MATERIALS, INCLUDING STEEL

[75] Inventor: John M. Lehto, Cokato, Minn.

[73] Assignee: Northern States Power Company, Minneapolis, Minn.

[21] Appl. No.: 234,914

[22] Filed: Aug. 22, 1988

Related U.S. Application Data

[63] Continuation-in-part of Ser. No. 153,242, Feb. 8, 1988, which is a continuation-in-part of Ser. No. 91,427, Aug. 31, 1987, abandoned.

[51] Int. Cl.$^5$ .............................................. C21B 11/02
[52] U.S. Cl. ...................................... 7.5/499; 75/958; 208/426; 208/427
[58] Field of Search ................ 75/28, 29, 40, 43, 501, 75/499, 958; 208/400, 426, 427; 60/39.02

[56] References Cited

U.S. PATENT DOCUMENTS

| | | | |
|---|---|---|---|
| 2,034,071 | 3/1936 | Wickland | 266/24 |
| 3,479,021 | 11/1969 | Escher | 144/66 |
| 3,617,042 | 11/1971 | Nakagawa . | |
| 3,669,318 | 6/1972 | Goksel | 222/317 |
| 3,770,416 | 11/1973 | Goksel | 75/25 |
| 3,801,305 | 4/1974 | Nilles et al. | 75/530 |
| 3,895,088 | 7/1975 | Goksel | 264/82 |
| 3,918,958 | 11/1975 | Heitmann | 414/786 |
| 4,008,054 | 2/1977 | Clancey et al. | 208/427 |
| 4,025,059 | 5/1977 | Steinmetz et al. | 266/215 |
| 4,057,231 | 11/1977 | Chaze | 266/900 |
| 4,164,469 | 8/1979 | Wagner | 75/29 |
| 4,219,519 | 8/1980 | Goksel | 264/82 |
| 4,239,530 | 12/1980 | Goksel | 75/34 |

(List continued on next page.)

FOREIGN PATENT DOCUMENTS

| 44669 | 1/1982 | European Pat. Off. | 75/3 |
|---|---|---|---|
| 0139310 | 7/1984 | European Pat. Off. . | |

(List continued on next page.)

OTHER PUBLICATIONS

Dow Starts a Coal Gassification Plant, *Chemical Week*, May 13, 1987.

(List continued on next page.)

*Primary Examiner*—Melvyn J. Andrews
*Attorney, Agent, or Firm*—Merchant, Gould, Smith, Edell, Welter & Schmidt

[57] ABSTRACT

A process and arrangement are provided for the efficient generation of energy from coal, while at the same time providing for a relatively inexpensive step in processing of iron or steel, and the extraction of valuable materials such as oils from coal. An advantage to the process is that relatively low quality coals can be utilized, since the coal is pretreated before any burning operation. Generally, the process involves three interacting stages. In the First Stage, a coal liquefaction/pyrolysis procedure is utilized to drive off volatiles, and form a very low volatile char. The volatiles can be collected and utilized as a valuable oil product, such as for diesel fuel or the like. The char material is preferably pelletized and utilized as a reductant, in a Second Stage of iron reduction and melting. Preferably the iron reduction and melting operation is conducted in a pressurized cupola and the high pressure hot product gases are utilized directly and/or indirectly, to generate electricity in Stage Three, and to produce hot steam for use in driving certain portions of Stages One and Two. High pressure product gases have a greater energy content than gases at atmospheric pressure and facilitate more efficient production of electricity in Stage Three. Problems of handling molten iron from a pressurized cupola are solved using the pressure to drive the molten iron up a vertical tap mechanism. The weight of the metal offsets the pressure as the metal rises so that the metal is driven up to a point at which the metal's pressure is decreased to atmospheric pressure. Also, preferably steel is formed from the reduced iron product of Stage Two. Preferred arrangements for generating steel are shown.

20 Claims, 6 Drawing Sheets

U.S. PATENT DOCUMENTS

| | | | |
|---|---|---|---|
| 4,309,024 | 1/1982 | Lillybeck et al. | 266/138 |
| 4,334,920 | 6/1982 | Mori et al. | 75/29 |
| 4,495,054 | 1/1985 | Claflin | 75/29 |
| 4,504,043 | 3/1985 | Yamaoka et al. | 266/160 |
| 4,511,372 | 4/1985 | Axelsson | 75/501 |
| 4,528,029 | 7/1985 | Goksel | 7/5 |
| 4,594,140 | 6/1986 | Cheng | 208/148 |
| 4,753,677 | 6/1988 | Rachner . | |
| 4,874,427 | 10/1989 | Hamada et al. | 75/483 |

FOREIGN PATENT DOCUMENTS

| | | | |
|---|---|---|---|
| 1583974 | 9/1970 | Fed. Rep. of Germany . | |
| 3345107 | 9/1984 | Fed. Rep. of Germany . | |
| 3510787 | 9/1986 | Fed. Rep. of Germany | 75/29 |
| 3523487 | 1/1987 | Fed. Rep. of Germany . | |
| 2011575 | 3/1970 | France . | |
| 2003496 | 3/1987 | United Kingdom . | |

OTHER PUBLICATIONS

KR Process-A Coal-Based Alternative to the Blast Furnace, *Iron and Steel Engineer*, Feb. 1986, pp. 30-33.

*Clean Coal Technologies*, 89, 9 (1989).

Pellet Technology Corporation, "Technology Overview," Mar. 1986.

K. W. Lange, "Thermodynamics and Kinetics at High Temperature in Ladle Metalluray," *Proceedings of the Second International Conference on Iron & Steel Technology and New Materials*, Oct. 7-9 (1986), Pohang, Republic of Korea, p. 43, Tables 5-7 at pages 76-77.

*Doe Report*, "Development of an Advanced, Continuous Mild Gasification Process for the Production of Co-Products—Industrial Market Assessment of the Products of Mild Gasification", J. E. Sinor et al., Jan. 1988.

*DOE Report*, "Development of an Advanced, Continuous Mild Gasification Process for the Production of Co-Products—Literature Survey Results", W. G. Willson et al., Jan. 1988.

Steel and Coal, vol. 185, 1962, p. 305.

Klara et al., *Paper Presented at Alternate Energy '89*, "Mild Gasification: A New Goal" (published Apr. 1989).

Suuberg et al., *Fuel*, 64, 1668 (1985).

Derbyshire et al., *Fuel*, 65, 1233 (1986).

Derbyshire et al., *Fuel*, 66, 1741 (1987).

Derbyshire et al., *EPRI Pub. No. GS-6219* (published Jan., 1989).

*DOE Pub. No. DOE/FE-0115-11* (published Jan., 1989).

"Costs of Synthetic Fuels in Relation to Oil Prices," a Report Prepared for the Subcommittee on Energy Development and Applications, 97th Congress, Mar. 1981.

"Synthetic Fuel Technology Development in the United States," A Retrospective Assessment by M. Crow et al., (1988), (pp. ix, x, xi, 32, 33, 46, 47).

"Gasification: Key to Chemicals from Coal", by J. S. Wilson et al., *Chemtech*, Feb. 1988.

"Process Improvements in Direct Liquefaction of Coal," Technical Brief, 1989.

FIG. 1

COGENERATION PROCESS FOR PRODUCTION OF ENERGY AND IRON MATERIALS, INCLUDING STEEL

This application is a continuation-in-part of application Ser. No. 07/153,242, filed Feb. 8, 1988, which is a continuation-in-part of application Ser. No. 07/091,427, filed Aug. 31, 1987, which has been abandoned in favor of continuation application Ser. No. 07/423,615, filed Oct. 16, 1989.

FIELD OF THE INVENTION

The present invention relates to thermoelectric power generation. In particular, the invention concerns the generation of power, from coal. A cogeneration process is involved, whereby a coal fuel is treated in a liquefaction procedure or step, for removal of valuable oils and the like therefrom. The resultant low-volatiles char is then usable in an iron reduction and melting process. During the high temperature iron refining process, product gases are generated. The gases are used, directly and/or indirectly, to power turbines and generate electrical power. The overall process particularly concerns a system in which advantage is taken of the characteristics of each individual step or stage, to facilitate an overall relatively energy efficient process. In a preferred application, steel is generated from the product of the iron reduction and melting process.

In an advantageous arrangement, iron is reduced under pressure greater than atmospheric pressure, generating gases under pressure which may be utilized to more efficiently power turbines and generate electricity. The present invention addresses the associated problem of handling molten metals under pressure.

BACKGROUND OF THE INVENTION

In recent decades achievement of efficient and relatively inexpensive electrical energy production has become a major concern. Of the various types of power plants, coal-burning plants have been particularly popular and widely used. The reasons for this include relative adaptability to a variety of locations and relatively wide availability of a comparatively inexpensive fuel.

A problem with conventional coal burning systems involves the general methodology of fuel use. In a typical system the coal is simply burned, with the waste discarded. This has generated two substantial concerns. First, coal fuels often include therein relatively useful organic fractions, which could be isolated and refined to useful oil products, such as diesel fuel or the like. Typically in conventional plants these fractions are merely burned, as an inexpensive fuel, along with the remainder of the coal. It is readily seen that this, arguably, is an inefficient utilization of the coal as a natural resource.

Secondly, conventional systems generally require a relatively high grade of fuel coal. For example, coal having a substantial amount of sodium therein is not readily utilizable, as it does not burn well. If such materials in the coal were first extracted therefrom, a lower grade coal could be effectively used as a fuel source.

Methods of coal liquefaction, i.e. the removal of volatile materials from coal, are well-known. Generally, however, such processes have not been practiced on coal to be utilized as a fuel for power generation. A major reason for this is that the resultant coal char has not been a desirable fuel. While such char has a significant energy content, it generally does not burn well and cleanly in conventional boilers. Thus, the use of char has been resisted by power companies.

Coal, typically in the form of metallurgical coke, is also utilized in the steel-making industry, for example to reduce oxides of metals such as iron. In one known process, coal products are pelletized with water, silica, burned limestone and taconite, and are treated in a high temperature oven such as a copula. To date, this method of generating metallic iron has received minimal attention.

What has been needed has been a more efficient method of energy production, utilizing, as the ultimate source of fuel, coal and coal products. More particularly, what has been needed has been a method of energy production wherein values other than simply crude fuel values of the coal fuel are more efficiently and effectively utilized, for example in iron refining and boiler operation. A particularly useful process would be one in which steel production occurs, as a by-product to energy generation.

If iron is reduced under pressure greater than atmospheric, the efficiency is increased as output gases have a greater energy content which can extracted to generate electricity. Thermal efficiency is also increased and higher gas concentrations and faster reaction rates are obtained, thereby resulting in better overall reduction. High pressure copulas require smaller containers for output gas purification, thereby allowing for off-sight assembly and much lower cost. The use of pressurized reduction has been avoided in the past, as molten metals under pressure present special handling problems.

OBJECTS OF THE INVENTION

Therefore, the objects of the present invention are: to provide a process for the generation of electrical power from coal fuel, wherein oil values in the coal are removed before the coal is utilized as a fuel; to provide such a method wherein following a liquefaction procedure a resultant coal char product is utilized in a reduction and melting process for the reduction of oxidized iron; to provide such a process wherein, during iron refining, high pressure hot product gases are formed which are utilized for the production of electricity, upon passage through a turbine arrangement; to provide such a process wherein the turbine arrangement preferably includes, in series, a gas turbine directly driven by gases from the iron refining process, and a steam powered generator, driven by steam produced in a boiler heated from a hot gas effluent from the gas turbines; to provide a process wherein steam generated in a boiler from hot effluent gases, from an iron refining process utilizing coal char, are in part utilized to provide a heat source for coal liquefaction in order to initially generate char material; to provide an overall process for the generation of oil products, the reduction of iron oxides, and the generation of electricity, which utilizes coal as the primary fuel source and source of reductant; and, to provide such a process which is relatively energy efficient, relatively simple to effect and which is particularly well-adapted for the proposed applications thereof. It is another object to the present invention to yield an overall process including a step of generation of steel, from products generated by the melting process. A further object to the present invention in an advantageous arrangement is to provide a process for the reduction of iron under pressure greater than atmospheric pressure, thereby producing hot output gases under pressure which may be utilized in a further step of electrical power generation, the output gases under pressure having a greater energy content, thereby effecting more efficient energy production; and to provide such a process wherein molten metal under pressure is forced up a vertical tap arrangement by the metal's own pressure, thereby using the weight of the metal to counterbalance the pressure and allowing the metal to be tapped at a height wherein the pressure of the metal is near atmospheric. Other objects and advantages of the present invention will become apparent from the following descriptions, taken in connection with the accompanying drawings, wherein and set forth by way of illustration and example of various embodiments and applications of the present invention.

SUMMARY OF THE INVENTION

The present invention concerns an overall process and plant design for the utilization of coal in an efficient process, wherein energy is produced and low cost iron refining is achieved. Further, potentially valuable oil products are extracted from the coal fuel source, and are made available for use in a variety of industries including the fuel industry, such as the diesel fuel industry. The overall process can be divided into a plurality of individual steps and stages; however, as will be understood from the detailed description, certain advantages are obtained from organization of the various stages into an efficient interdependent system, wherein energy from various stages is utilized in a relatively efficient manner to help drive other steps and stages. This will be readily apparent from the schematic representations described in detail below. The result is an overall useful plant construction, providing for oil generation, iron refining and energy production with relative cost efficiency. In one embodiment, product from the iron refining stage is utilized in a steel making procedure.

It will be appreciated that refinement of iron under pressure greater than 50 psia has an added benefit of producing output gases under pressure. These pressurized gases are desirable due to their greater energy content than gases at atmospheric pressure and therefore produce more energy when used to drive a turbine. Problems associated with controlling pressurized molten metals in a pressurized refinement process has slowed acceptance of such an arrangement. In an advantageous arrangement, the pressure of the gases drives the metal up a vertical tap arrangement. The weight of the metal counteracts the gas pressure, so that at some height, the head pressure of the molten metal is reduced to near atmospheric, solving the handling problems. The molten metal may then be tapped for safe and easy handling.

During a first stage of the present invention, coal, provided as a fuel source, is treated in a liquefaction step, for the removal of volatile fractions therefrom. Simultaneously, undesired mineral values may also be extracted. An advantage to this latter, is that those mineral values which might otherwise interfere with desired utilization of the coal as a fuel source are removed early in the process. Thus, a relatively low quality coal can be used in a process according to the present invention. As a result, cost efficiency and effectiveness are enhanced.

A variety of liquefaction procedures may be utilized during the liquefaction step. One method is solvent extraction followed by pyrolysis. Typically, a phenolic solvent would preferably be utilized, to initiate the extraction procedure. This would be followed by a relatively mild pyrolysis, using steam and oxygen, to drive off volatiles and remove additional valuable liquid fractions and generate a low volatile char product for use in the iron reduction procedure, i.e. the next stage.

Alternatives to the specific liquefaction procedure described above include: hot water treatment followed by water/steam extraction, rather than organic solvent extraction, and a mild pyrolysis; steam extraction only; and, pyrolysis only. The combination of organic solvent extraction and mild pyrolysis is generally preferred, for its energy efficiency and ability to achieve removal of substantially all relatively volatile components, leading to a particularly desired char for reduction purposes.

Char generated from a liquefaction step is usually fairly active, and is generally in a powdered form. Such material may spontaneously burn upon exposure to air, if dry. Thus, if it is to be stored for any considerable period of time, it is usually preferred that it be placed under an inert atmosphere and/or wetted down somewhat, typically about 30% moisture by weight being sufficient to inhibit combustion.

The char material's active quality makes it a good substitute in many uses for activated carbon, for example in water purification. The high cost of activated carbon makes the char material a cost efficient source. Use in a purification step has no substantial effect on the char material's usefulness in subsequent iron reduction processes, as the energy content is not reduced.

Following any use as an activated carbon, the char material will be prepared for utilization in an iron reduction and melting step. In one embodiment, this is preferably done through a pelletization process, wherein the char material is mixed with a binder, usually including lime and silica, and is treated with steam for induration, i.e. hardening into pellet form. The pellet form generally enhances the chemical reactions of iron reduction, and makes the char material easier to handle and less likely to be blown about by gases in the iron reduction step.

Char material formed during the First Stage described above, may be utilized for the reduction and melting of a variety of iron materials including iron ores such as taconite, and also scrap metal iron. If scrap metal iron is utilized, pellets made as described above are typically mixed directly with the scrap metal irons and the refining process is run. If scrap iron, already reduced, is used, the process is still very cost efficient as melting in a smelter device used in the present arrangement is more cost efficient than melting in a standard furnace. If iron ore, such as taconite, is utilized, then preferably some of the char material is pelletized with the taconite itself, again the pellets including a binder.

In Stage Two, iron oxides are reduced, typically in a smelter device such as an oven or copula, in the presence of the char material which acts as a reductant. The products of a typical Stage Two generally include slag, liquid metals, and hot gases. The hot gases are utilized, directly and/or indirectly, to generate electrical power in the third general stage. In some embodiments Stage Two conditions may be varied slightly, for advantages. For example, chromite may be included in the pellets, to generate stainless iron. Also, kiln conditions may be used to form directly reduced iron. In advantageous auxiliary processing steps to stage 2, the reduced iron oxide material can be refined into steel, for example by operation of the kiln or additions to the kiln, with gas and mineral injection.

It is advantageous to operate State Two reduction under pressure as the output gases generated are under pressure. More efficient Stage Three power generation is obtained with pressurized gases to drive turbines. In an advantageous arrangement of the present invention under pressure, problems associated with production of pressurized molten metal are addressed by a vertical tap arrangement for lowering the pressure. The pressure of the gases forces the metal up a vertical tap arrangement; as the metal rises, its own weight offsets the gas pressure so that at some elevation, the head pressure is reduced to atmospheric and the molten metal may be tapped for further handling.

In an alternate Stage Two embodiment, the coal char material is mixed with lime and is gasified. The coal gas is then brought into contact with iron material to be reduced and melted. In a preferred system, the coal char is gasified in a chamber such as a conventional melter/gasifier. Iron material, such as ore, is fed into a separate chamber, wherein it is exposed to hot coal gas from the melter/gasifier. The reduced ore material is then fed directly into the melter/gasifier wherein it is melted, and drawn off as pig iron. This pig iron material may be refined to steel, as described below.

Stage Three involves utilization of the hot gas effluent from the copula or reduction and melting process generally. In some embodiments, the copula may be structured to operate under substantial pressures, to enhance efficiency and reduce residence time. In others, relatively low pressure processes may be used. In either case, the hot gases escaping from the reduction and melting process include generally about 30–40% carbon monoxide therein, among other gases. The rapidly cooling gases may be of relatively low temperature, 300°–600° F., in comparison to the copula operating temperature, usually well above 2,000° F. (typically about 2,500°–2,900° F.), and generally include particulate matter such as char dust therein. For a typical process, the escaping gases are passed through a filter arrangement or the like, for removal of the solid particulate manner.

In preferred Stage Three procedures, the waste gases are directed into a burner, wherein they are ignited in the presence of oxygen, to oxidize the carbon monoxide and increase the temperature of the gases considerably, typically to over 2,000° F. These very hot gases, having substantial energy, may then be driven into a gas turbine arrangement, whereat the energy of the gases is utilized directly for the generation of electricity. This is particularly desirable if the gases are under substantial pressure from an advantageous arrangement wherein the copula is pressurized. A high pressure gas turbine is an effective means of tapping the energy represented by the pressure of the output gases. The cooler, lower energy, gases admitted from the gas turbine arrangement are then preferably directed into a boiler, for the generation of steam. Steam generated by the boiler may be utilized to drive a steam turbine, and produce electricity. Further, hot steam generated by the boiler may be utilized to facilitate many of the steps; for example as a heat source for the solvent and/or steam extraction/liquefaction of Stage One.

As the hot gases leave from the boiler, they still contain substantial heat which may be effectively utilized to facilitate processes according to the present invention. For example, these hot gases may be driven through a heat exchanger to heat air that is directed to various steps of the process, including air directed into the hot blast copula in Stage Two, or any other Stage Two equipment.

In the schematic representations discussed in detail below, particularly efficient systems utilizing steam generated in a boiler, and heat generated from the reduction and melting steps, are shown. The drawings constitute a part of this specification, and include an exemplary embodiment of the invention, while illustrating various objects and features thereof. It will be recognized that the drawings, being schematic only, indicate general embodiments, and a variety of specific arrangements may be utilized according to the principles of the present invention.

BRIEF DESCRIPTION OF THE DRAWINGS

FIG. 1 is a schematic representation of a plant system for implementation of a process according to the present invention.

DETAILED DESCRIPTION OF THE PREFERRED AND ALTERNATE EMBODIMENTS

Figure 2:
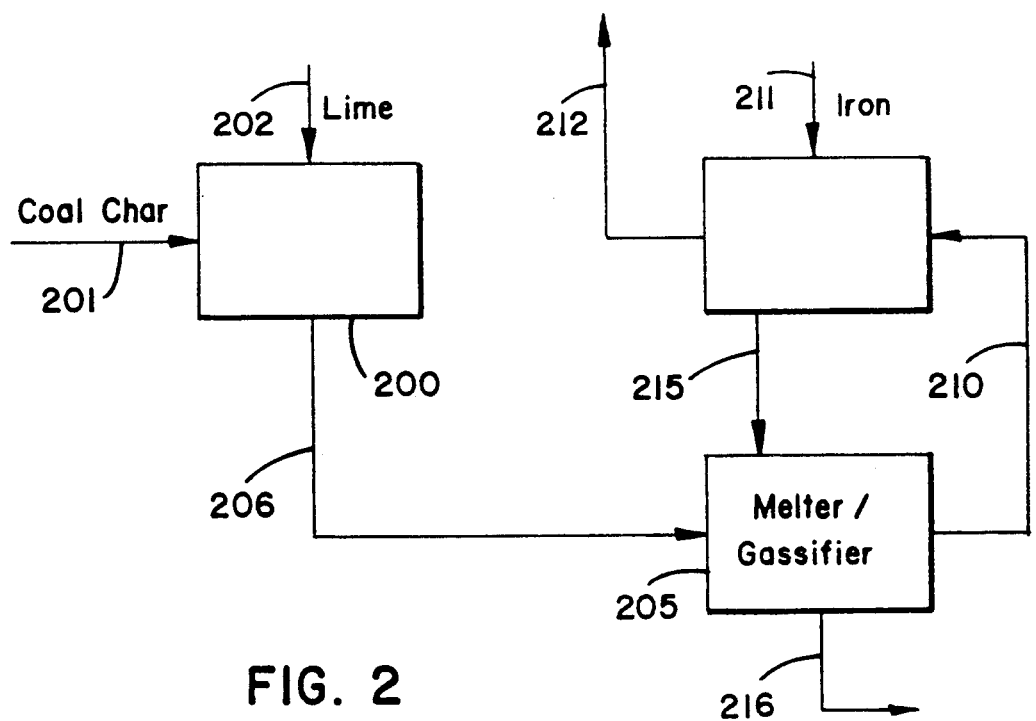
FIG. 2 is a schematic representation of a portion of a plant system according to an alternate embodiment of the present invention.

As required, detailed embodiments of the present invention are disclosed herein. However, it is to be understood that disclosed embodiments are merely exemplary of the invention which may be embodied in various forms. Specific structural and functional details disclosed herein are not to be interpreted as limiting, but rather as a basis for the claims and as a representative basis for teaching one skilled in the art to variously employ the present invention in virtually an appropriately detailed system.

In general, the process according to the present invention will be described in terms of three stages: a First Stage in which coal is treated for the formation of char and the removal of oil values; a Second Stage in which the char product is utilized in an iron-refining operation, to generate useful high pressure hot gases and reduced iron which may be refined to steel; and, a Third Stage in which high pressure hot gases from Stage Two are utilized in the generation of electricity. In a preferred arrangement as described and shown, the three stages are interacted, so that energy generated in each stage is effectively utilized throughout the entire process, in a preferred manner. This will become more apparent from the following descriptions.

Stage One—Processing of the Coal to Generate Char and Coal Oil Products

Figure 1:
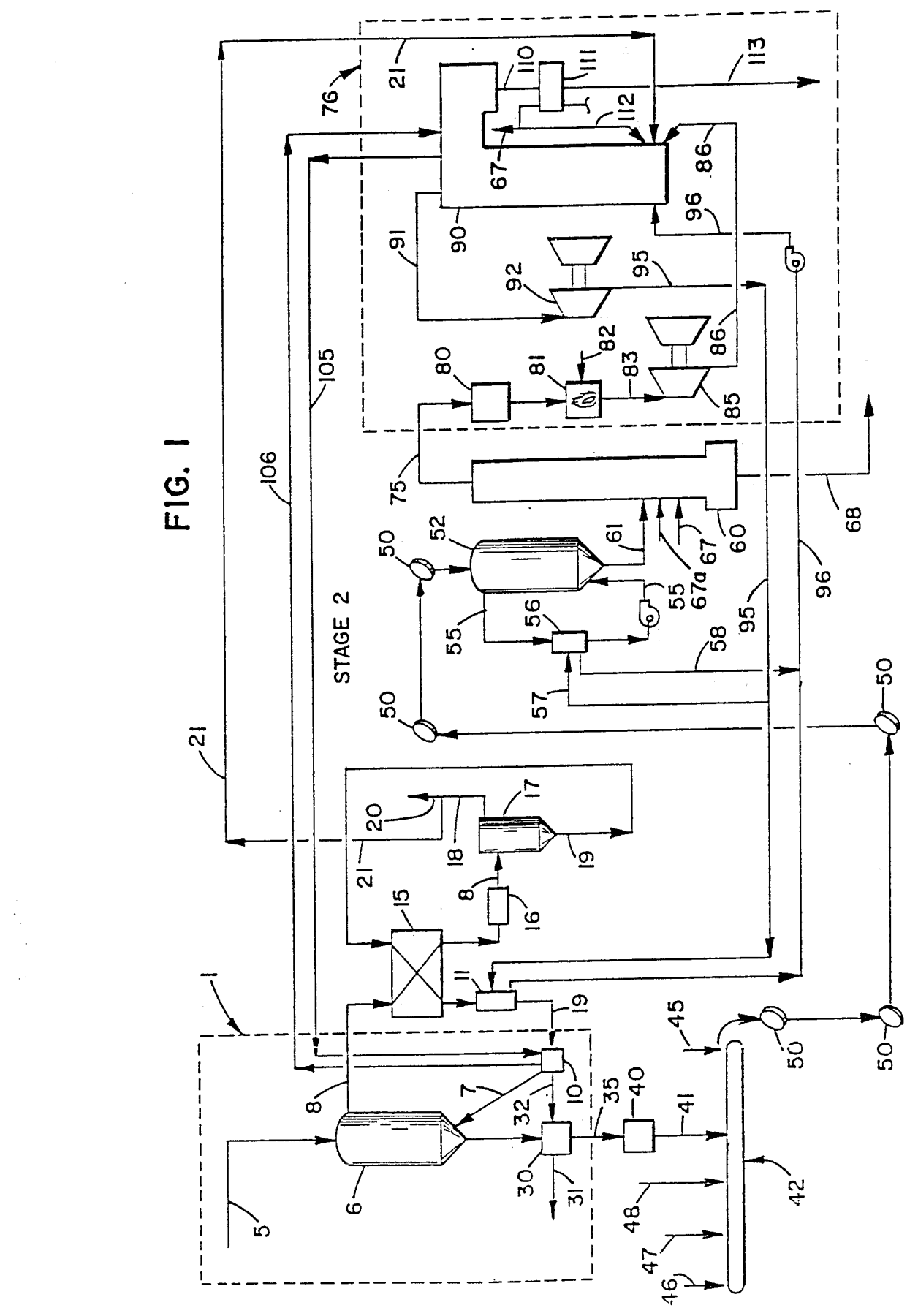

Referring to FIG. 1, the reference numeral 1 generally designates Stage One of the process, wherein coal is treated to form char, with oil materials extracted therefrom. FIG. 1 will be understood to represent a power plant operated according to the principles of the present invention. At reference numeral 5, a coal feed is represented. A variety of grades of coal may be utilized in processes according to the present invention, in some instances including those grades which include too high a mineral content to generally be efficient as a conventional boiler feed stock In the First Stage, extraction/liquefaction procedures are employed to remove materials from the coal feed stock. A variety of methods are utilizable in processes according to the present invention. Generally, what is required is the ultimate removal of relatively volatile components and also extraction of mineral components, from the coal, to leave char material having relatively low volatiles content.

In a preferred application of the present invention, coal feed 5 is directed into a liquefaction system including an autoclave 6, whereat it is extracted by a solvent, such as a phenolic solvent or water/steam. Generally, extraction with a phenolic solvent at about 350° to 420° C., 450 psia, is effective to rapidly extract volatile materials out of coal. The hot solvent is represented fed into the autoclave via line 7, and is removed therefrom via line 8. The solvent, in FIG. 1, is shown at least partially heated by heat exchangers 10 and 11, described in further detail below. Heat exchanger 15 is positioned to cool the solvent from the extraction, directing same also through cooler 16 and into separator 17, wherein the extracted oil materials are separated from the solvent. The separator 17 may be of any of a variety of conventional types, including distillation systems, with the oil product being taken off at line 18 and the solvent being drawn off at line 19 and redirected into the autoclave 6, along line 7. For the embodiment shown the solvent, via line 19, is directed through heat exchanger 15, as well as heat exchangers 10 and 11, so that it is heated sufficiently to generate the extraction via a continuous method. The volatiles removed via line 18 are shown separated into two components, at lines 20 and 21. Conventional separation techniques, not detailed, are generally utilized to separate more valuable coal oils, such as oils utilized as diesel fuel or the like, at line 20, with less valuable but readily burnable materials being directed via line 21 into a Stage Three boiler, described below, as a supplemental fuel source. Generally, at least about 65 gallons of useful oil can be extracted from a ton of coal.

At a second step in a preferred Stage One liquefaction system, the partially extracted residue from the autoclave 6 is directed into a pyrolysis oven or chamber 30, for mild pyrolysis, to ensure reduction of volatiles as far as reasonably possible. The reason for this is that it is desired to use a char with relatively little volatile material therein, in the iron reduction step of Stage Two. Typically, pyrolysis at about 600° C. and 1 atm., in the presence of steam and oxygen, readily extracts the remaining volatiles along line 31, leaving the char residue in a powder form. This relatively mild pyrolysis is advantageous, since it has relatively low energy demands, which can at least in part be met via heat supplied by heat exchanger 10. The volatiles drawn off via line 31 can be collected by conventional means, as desired. A steam circulation system, providing for a continual feed via line 32 from heat exchanger 10, can be provided in a conventional manner, if necessary or desired.

It will be understood that extractions and pyrolyses such as described may be used to remove metal salts from the char, as well as organic volatiles. Char material is shown being removed from pyrolysis oven 30, via line 35. Again this char material has a relatively low volatiles content, and is well-suited for utilization in Stage Two as described below.

A variety of alternate liquefaction procedures may be utilized, including a two-stage liquefaction with hot water pretreatment and a water/team extraction being utilized in place of the organic solvent. Generally, such a system would require a follow-up low temperature pyrolysis. The hot water pre-conditioning of the coal material facilitates extraction via the steam process. Such a process would typically involve, for example, pretreatment with water at about 200° C. for a brief period, typically 15–25 minutes, followed by steam extraction at about 375° C. and about 750 psia. The follow-up pyrolysis would be as described above, in oven 30 for example at about 600° C. and atmospheric pressure.

Single step liquefication processes may also be adaptable for utilization in association with systems according to the present invention, although generally such systems may be less efficient as they do not as readily lead to char having a very low volatiles content; or, when they do, they produce less of the valuable liquid products. In one type of single step system, only a pyrolysis process would be initiated, with the extraction process in the autoclave 6 being bypassed. In a second, only extraction in the autoclave 6 would be done, with a pyrolysis at 30 being bypassed. It will be understood that the liquefaction process chosen will generally depend upon cost, the nature of the coal feed, and the char product desired.

The active char material is suited for use as an activated carbon, for example in water purification. The char material may be used for purification and then further utilized in reduction of metals. Use in purification does not substantially decrease the char materials effectiveness in reduction as the char's energy content is not substantially affected. Activated carbon or charcoal is quite expensive. Char material provides an inexpensive source of such active material with a follow-up use of the deactivated char product, in steel production.

Regardless of the method of liquefaction chosen, the general process is to provide a low volatile char material for direction into Stage Two. In addition it is preferred to accomplish char generation in the lowest cost, most energy efficient, method as possible. It will be readily understood that the solvent extraction/mild pyrolysis steps described in detail above will be generally advantageous as extreme conditions and long reaction times are generally avoided.

Stage Two—Reduction of Iron Material; Refinement to Steel

In Stage Two of a process according to the present invention, iron materials are reduced and/or melted to irons for use in the manufacture of steel and the like. The iron material to be reduced and/or melted may be from a variety of sources, including iron ores and scrap metal iron. Generally, according to the present invention relatively expensive coke material is avoided and is replaced with a relatively low cost by-product of energy productions, char, in a process for the manufacture of relatively inexpensive iron and steel products. This is accomplished, generally, as follows.

Char from takeoff 35 is generally in a powdered form, and is often highly reactive. If exposed, dry, to oxygen, spontaneous combustion is possible and likely. Generally, rather than being stored the material is pulverized if necessary, and for preferred applications is formed into pellets for use in an iron reduction reaction.

The nature of the pellets formed will depend, in part, upon the nature of iron material to be reduced and/or melted. Generally a variety of iron sources may be utilized in processes according to the present invention. Most typically, several major sources will be used: oxides, for example in the form of iron ore, such as taconite; scrap metal iron; and, waste oxides, for example created during steel production and manufacturing processes. Scrap metal iron, it will be understand, generally includes a considerable amount of iron oxides therein.

In FIG. 1, a process utilizing taconite is illustrated. The char material, after grinding in mill 40 is directed via line 41 into a mixing and pelletization system 42, wherein it is pelletized with various binder materials, and if necessary the iron ore. A variety of conventional pellet forming mechanisms such as mixer-mullers and pelletizing discs may be utilized as part of system 42. Generally, what is required is that the char material be mixed with ore, shown introduced via line 45, in a manner ensuring pellet formation. To accomplish pellet formation, binder materials such as water, silica and burned limestone are added, in small amounts, to the pellets. In FIG. 1, water, silica and limestone are shown fed via lines 46, 47 and 48, respectively. These materials enhance agglomeration, under application of heat.

Typically, pelletization includes formation of a plurality of small pellets, about $\frac{1}{4}$-$1\frac{1}{2}$ inches in diameter, each including, by weight, about 10–18% char, about 60–80% taconite, about 8–15% water, and about 1–8% burned lime, although variations may be used. Such pellets are generally readily agglomerated and provide sufficient association of the carbon (char) with the iron, to facilitate the reduction process when heat is applied.

Agglomeration is generally facilitated by application of heat and steam. Referring to FIG. 1, the pellets 50 formed by pellet maker 42 are shown directed via line 51 into autoclave 52 for induration. In autoclave 52, heat and steam are applied, to provide for a stable, hard, pellet material. Typically, steam at about 175°–225° C., under pressures of 75–300 psi may effectively be utilized to generate the hard particles. It will be understood, however, that a variety of pressure and temperature conditions may be utilized, depending upon the specific pellet composition involved, and the pellet use intended. Further, optimization of temperature and pressure may be found empirically for various systems, to enhance energy savings and achieve a desired induration time.

Pellets, such as those previously described, may be directed into an oven such as a copula, for reduction of the iron. In some instances, however, rather than taconite or iron ore, scrap metal iron may be utilized. Under such circumstances, generally the pellets of char material should be formed without the iron mixed directly therein, but rather only from char material containing enough silica, limestone and/or water to provide efficient agglomeration. For this latter modification of the process, generally the char pellets would be charged into the copula, as a mixture with scrap metal iron.

Referring to FIG. 1, since the induration in autoclave 52 is a relatively low temperature process, it may be accomplished at least in part using steam fed from line 55, and heated via heat exchanger 56. The preferred heat exchanger 56, is shown at least in part heated via steam lines 57 and 58, from the boiler of Stage Three. This will be described in further detail below. A result of this advantage is a lower energy-consuming overall process.

Pellets from autoclave 52 are shown, in FIG. 1, being directed into copula 60 via line 61. A variety of conventional copulas 60 may be utilized in processes according to the present invention. Copula arrangements producing iron and slag are generally described in "Conclusions on Slagging, Fixed-Bed Gasification of Lignite", by William B. Hauserman and Warrack G. Willson, presented at the 1983 Lignite Symposium at Grand Forks, N. Dak. May 18-19, 1983, incorporated herein by reference. Further, it is foreseen that in some applications copulas modified for operation at a relatively high pressures, for example 100–300 psia, may be used to facilitate the reduction process. In such applications, energy production is enhanced by using the pressurized copula for energy production. The output gases have more energy as represented by the pressure and facilitate more efficient energy production, in manners to be described below. Other oven systems, such as kilns, may be used in some processes.

Generally, feed stock for the copula 60 is fed in as a solid, piled such that air or the like can pass therethrough. If taconite is to be reduced, typically the iron ore containing pellets are simply piled into the copula or furnace. Generally one-half of the char material will not be in pellet form and will be agglomerated with the iron. On the other hand, if scrap metal iron is involved, char pellets are mixed into a pile in the furnace, along with the scrap metal. Hot air, used to facilitate the reduction process, is shown fed into the hot copula 60 via line 67. Gases and minerals may be injected into the copula via line 67a, for refinement of steel. Slag and molten metal are shown removed via line 68. It will be readily understood that this process comprises a relatively low cost, energy efficient, step in the manufacture of steel products or the like. Further, relatively low capital costs are involved, since high efficiency permits relatively small smelters or copulas to be used. The low capital costs are also enhanced by the valuable oil extraction of Stage One, and the relatively efficient energy generation of Stage Three.

Hot gases escaping from the copula 60 are shown drawn off at line 75. From a typical copula operation these hot gases include about 30–40% carbon monoxide, and are at a temperature of about 300°–600° F. and in some systems using a pressurized copula, may be under pressure of 250–300 psia. In a typical copula operation, the gas blown into the copula 60 is preferably around 800°–1,200° F., and in the copula 60 it is heated to about 2,500°–2,900° F. The gases are generally rapidly cooling as they transfer heat energy to the materials in the copula 60. In some advantageous systems according to the present invention, as indicated above, the copula 60 may be operated under substantial pressures, on the order of about 250–300 psia for more efficient energy production, as will be described below. In other instances, pressures near atmospheric may be utilized.

The gases drawn off through line 75 are utilized in Stage Three (reference numeral 76) in a preferred manner, to generate electrical power.

Stage Three—Electrical Power Generation

In Stage Three, as indicated above, the hot gases removed from the copula 60 are utilized to generate electrical power. Further, heat from these gases is utilized, as described below, to facilitate the other stages of the process. In an advantageous arrangement, the hot gases from copula 60 are also under pressure and may be further utilized to generate power, in a manner as described below. Referring to FIG. 1, hot gases from the copula 60, via line 75, are preferably directed through a filter or cleaner 80, for the removal of particulate material entrapped therein, from the cupula process. Such materials include, for example, products from hot gas treatment of the char pellets. This screen or filter process generally is used to protect downstream equipment from injury. Sulfur may also be removed very effectively at this point, with an absorbent, for example in the gas screen.

As previously indicated, the gas in line 75 includes a substantial amount of carbon monoxide (generally 30-40%) therein. Advantage may be taken of this carbon monoxide content. In particular, the carbon monoxide is oxidized with air, at burner 81. This increases the temperature of the gas to near 1800°-2200° F., and further leads to the destruction of the potentially hazardous carbon monoxide. Air for the oxidation is shown fed into burner 81 via line 82. Hot, oxidized, gas is shown drawn off at line 83.

The high temperature high pressure gases from burner 81 are used for the generation of electricity. It will be readily understood that there are advantages to the utilization of gas under substantial pressure from the copula 60, as more efficient turbine operation is achieved. Gases under pressure have a greater energy content which may be tapped to drive high pressure gas turbines, thereby accomplishing more efficient energy production. For preferred plant systems, gas turbine 85 provides for energy production, from copula gases.

After passing through the gas turbine 85, the hot gases, illustrated by line 86, in preferred processes will still represent a substantial energy source, due to their still relatively high temperature, typically about 800°-1,100° F. These waste gases are shown directed into boiler 90, for the generation of steam. The steam may be utilized in a variety of manners. For example: Steam line 91 is shown being used to drive turbine 92, for the production of still more electricity. The outlet steam line 95, from turbine 92, is shown providing heat to heat exchanger 11, which is utilized to drive the original extraction in Stage One. Also, outlet line 95 is shown communicating with heat exchanger 56, via lines 57 and 58, to provide an energy source for induration of pellets in Stage Two. Ultimately, steam or water is returned to boiler 90, via line 96. It is noted that turbine 85 can be used to drive a compressor, for example to furnish pressurized combustion air to the copula 60 or to line 82.

Very hot steam, on the order of 400° C. or higher, is shown being drawn off of boiler 90, via line 105. This steam is directed via line 105 into heat exchanger 10, to facilitate the original extraction process and also the pyrolysis process. Once cooled, this steam/water is returned to the boiler via line 106.

Heat feed to the boiler 90 may be from a variety of systems. For the preferred system according to the present invention, the majority of the heat drive is provided via the hot gases drawn off of the copula 60, indicated in line 86. Other sources of heat include energy derived from the less important and less valuable coal oil products, shown directed into boiler 90 via line 21.

Hot gases escaping from the boiler 90 are shown drawn off at line 110. Such gases are still relatively hot, and can be utilized in heat exchanger 111 for a variety of purposes, including to heat air used in boiler 90, shown introduced via line 112, and also to help heat air directed into the copula 60, shown in line 67. Ultimately, the gases from line 110 are discharged to the atmosphere, as indicated in line 113. Typically, they first pass through a scrubber arrangement or the like, not shown, which may be of a conventional construction and is used for pollution control. While the gases include substantial amounts of carbon dioxide, overall emissions may be lower than for conventional systems wherein less efficient use of the coal is made.

From the above descriptions it is readily understandable that an advantage to the present invention is that an overall interdependent system is provided, wherein coal is very efficiently utilized in a combination energy generation and iron refining facility. Relatively highly valuable components in the coal, i.e. the coal oils, are originally extracted. A formerly low value char material is utilized both to reduce iron, and lessen the costs of iron and steel production, and to produce a gas product facilitating efficient energy generation.

Alternate Stage Two Operation

In an alternate Stage Two operation, a pelletization procedure is avoided. Referring to FIG. 2, the coal char from Stage One is fed into pressurized feed bin 200 via line 201, wherein it is mixed with lime, fed via line 202. This mixture is fed under pressure into a conventional melter/gasifier 205, via line 206. In melter/gasifier 205 sufficient heat is provided to gasify the coal char. Off gases are fed via line 210 into a reduction furnace which includes therein oxidized iron material such as ore, fed via line 211. The off gases from the reduction are removed via line 212, and are used analogously to off gases from a copula as previously described. For a typical system, the reduced iron material is fed via line 215 directly into the melter/gasifier wherein it is melted and removed via line 216.

Modified Process for the Production of Steel

Processes conducted in the copula, or in association with the copula, may be utilized to generate steel products, as opposed to mere iron products. As previously suggested, line 67a, FIG. 1, generally represents selected introduction of various gases and minerals into the copula, for the generation of steel. Two preferred manners and systems for conduction of steel generation, in processes according to the present invention, will be understood by reference to FIGS. 3, 4, and 5. These figures schematically illustrate multi-chamber refining units which can be used in association with a copula, to provide preferred refinement.

Figure 3:
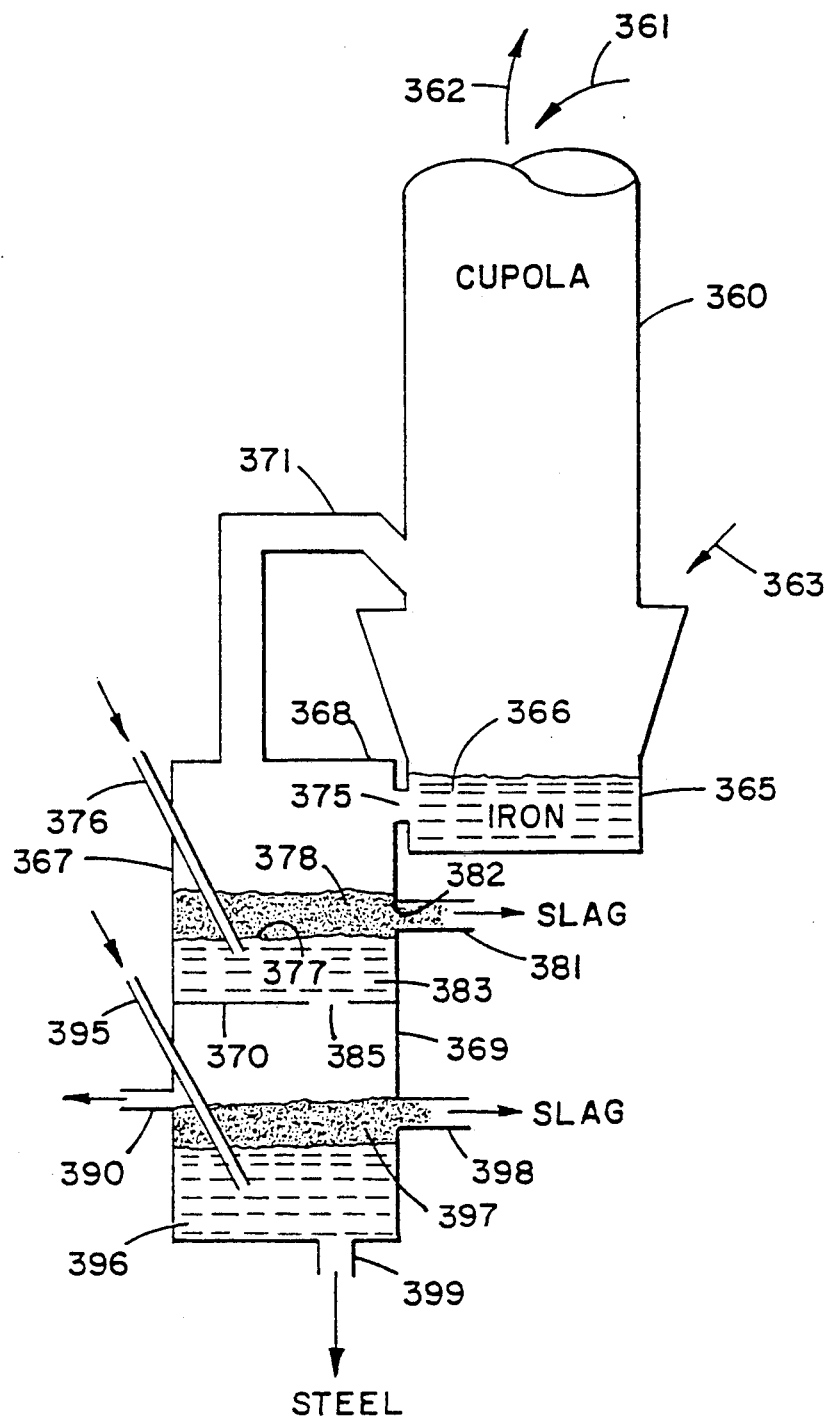
FIG. 3 is a schematic representation of a portion of a plant system according to an embodiment of the present invention, wherein molten metal drawn off of the copula is refined to steel.

Referring to FIG. 3, a copula 360 specifically adapted for use in generating steel is illustrated. For the embodiment illustrated in FIG. 3, pellet introduction into the copula 360 is generally indicated at line 361, and off gas escape is generally indicated at line 362. Air or oxygen introduction into the copula 360 is generally indicated at line 363. In a bottom area or section 365 of the copula 360, during operation, reduced iron 366 will collect. It is foreseen that this iron 366 can be selectively tapped, under copula operating pressures, into a multi-chamber refining unit or arrangement 367 having an upper (first) chamber 368 and a lower (second) chamber 369, separated by interface 370. The upper chamber 368 is vented to the copula 360 via line 371.

During a typical operation, iron would be tapped from the copula furnace with approximately the composition shown in Table 1 below, under the heading "Copula Discharge". Such a metal has undesirable quantities of carbon, sulfur, phosphorus, oxygen, and other elements therein. The metal would be tapped under pressure, i.e. the operating pressure of the copula 360, 375, i.e. flow/gate means, and into upper chamber 368. The gate 375 may include conventional means (not shown) for selective opening and closing.

In general, the chambers 368 and 369 include means for selective introduction of gases and minerals thereto. In the upper chamber, calcium oxide (lime) can be added to remove sulfur and phosphorus with the slag that forms. These materials could be introduced via line 376, below the upper surface 377 of molten material in chamber 368. The line 376 would typically be used to deliver a gas stream of argon, nitrogen or other gas, typically at a rate of about 50 kilograms per ton of steel. Oxygen would also typically be blown into the chamber, preferably also under the surface of molten metal. Such oxygen would react with the carbon present, to form carbon monoxide, which could be exhausted as a gas in to the copula of 360, via line 371. It is anticipated that for typical operations, the composition of the molten metal leaving the upper chamber would generally be as shown in Table 1 under the column headed "Upper Chamber Discharge". Slag 378, on the surface of steel forming in the upper chamber 368, could be selectively removed by means such as shown via line 381, through gate 382.

Gate or gate arrangement 385, in the bottom of upper chamber 368, can be used to selectively discharge the steel 383 into the lower chamber 369. After gate 385 is reclosed, the pressure in the lower chamber 369 can be reduced to nearly atmospheric pressure, by venting the chamber 369 via line 390. The hot off gases through line 390 can be directed elsewhere in the overall process, for example at the steam generating furnace.

The reduced pressure in lower chamber 369 aids gas release from the liquid steel. Also, aluminum may be injected into the lower chamber 369 via line 395, preferably with strong mixing. In typically procedures, aluminum will be injected at a rate of about 20-60 kilograms per ton of steel. The aluminum can react with oxygen to form aluminum oxide, which will combine with the slag. Generally argon would also be feed via line 395, to bubble through the steel 396 and remove nitrogen and hydrogen. Typical rate of injection of argon would be approximately 50 liters per minute per ton of steel. An added benefit of bubbling the argon through the steel is to bring inclusions to the surface, where they coagulate with the slag 397. Such inclusions typically include oxides, sulfides, oxysulfides, nitrides and carbides of aluminum, iron, silicon and other elements. The bulk of the material in the slag 397 comprises FeO, MnO, and SiO. These materials can be removed readily via means such as line 398, as slag, with the final steel product being removed via bottom port 399, selectively.

The approximate composition of liquid steel after the aluminum argon injection procedure is illustrated in Table 1 below; under the heading "Aluminum and Argon Injection".

Subsequent to aluminum and argon injections, the lower chamber would typically be operated under a partial vacuum to remove additional gases. Calcium oxide - calcium fluoride may be added to remove additional sulfur at this stage, when the oxygen potential has been reduced to lower levels. About one to three kilograms of $CaO$-$CaF_2$ would typically be added per ton of steel (90% CaO, 10% $CaF_2$). In a batch process this would be done in a period of about three to five minutes. This material would tend to modify the remaining inclusions to a calcium aluminate form, which has a spherical shape preferred for steel products.

In Table 1 below, the composition of the final product remove via port 397, after the calcium oxide-calcium fluoride treatment is indicated under the heading "Clean Steel". It is anticipated that under various conditions an even cleaner product than that suggested by Table 1 can be obtained.

TABLE I

| | Cupola Discharge | Upper Chamber Discharge | Aluminum and Argon Injection | Clean Steel (less than) |
|---|---|---|---|---|
| Fe | 95.42% | | | |
| C | 3.0% | | 0.1% | 0.04% |
| S | 0.03% | 0.02% | | 0.015% |
| P | 0.006% | | | 0.015% |
| N | | 70 ppm | 30 ppm | 15–40 ppm |
| O (dissolved) | | 150 ppm | 60 ppm | 6 ppm |
| O (total) | | | | 17–35 ppm |
| H | | | 5 ppm | 2 ppm |
| Cu | 0.01% | | | |
| Ti | 0.01% | | | |
| Mn | 0.08% | | | 0.40% |
| Cr | 0.02% | | | |
| Ni | 0.02% | | 0.03% | 0.02% |
| Si | 1.45% | | | |

Figure 4:
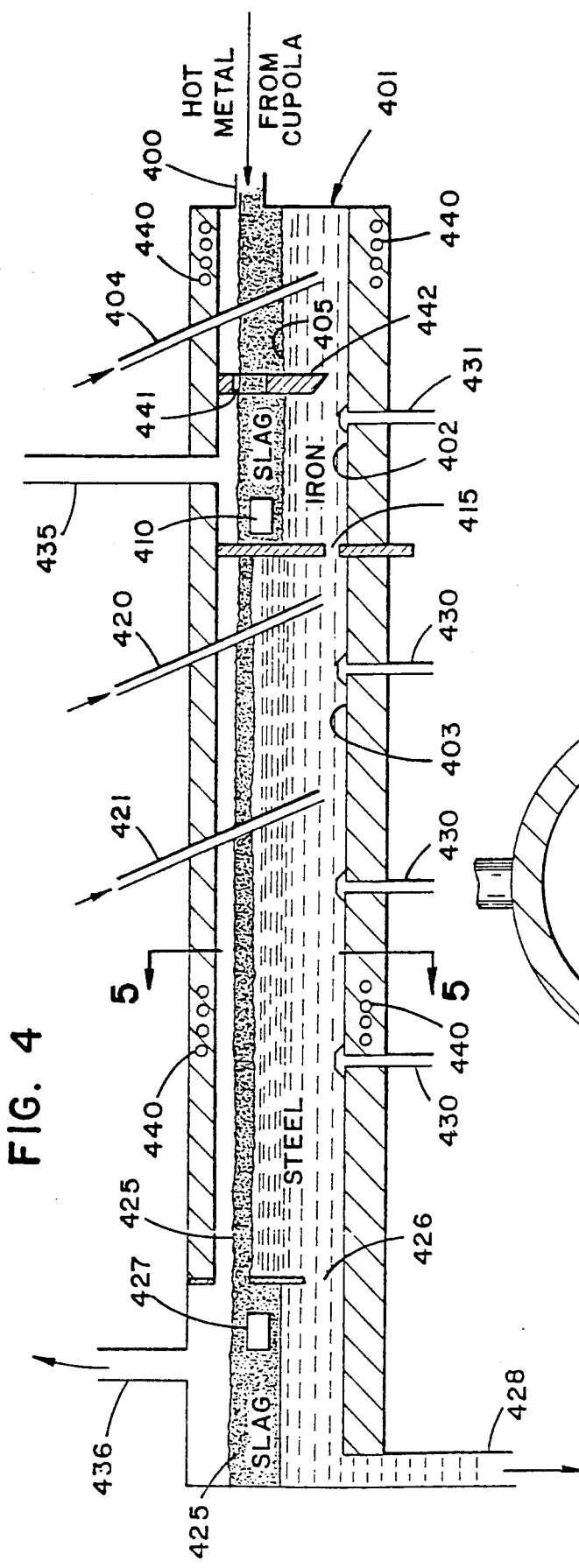
FIG. 4 is a schematic representation of a portion of a plant system according to an alternate embodiment of refining molten metal material drawn off of the copula, to steel.
Figure 5:
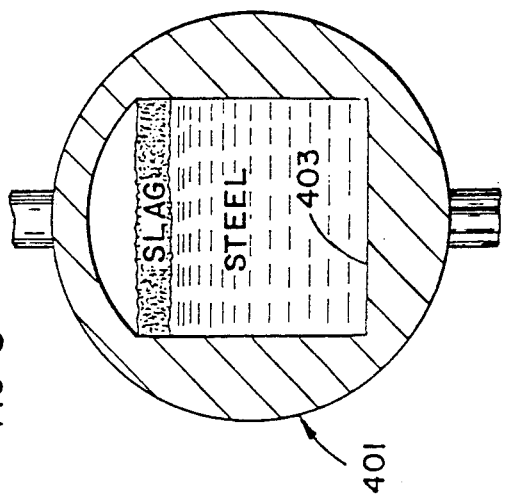
FIG. 5 is a schematic, cross-sectional view taken along line 5—5, FIG. 4.

An alternate arrangement is illustrated by FIGS. 4 and 5. This arrangement is adapted for operation on a substantially continuous flow of material from the copula. For the arrangement shown in FIG. 4, molten iron is continuously tapped from the copula, via line 400, into chamber arrangement 401. As the stream of molten metal flows through first chamber 402 toward laterally spaced second chamber 403, lime (i.e. mineral material) and oxygen can be injected into the bottom channel via means such as line 404. Slag can continuously be removed from an upper surface 405 of the molten iron via means such as tap 410.

The molten iron would then be allowed to flow through port 415 into the second chamber 403. In this chamber aluminum (mineral) and argon (gaseous material) could be readily injected via means such as line 420. In general, it is foreseen that the second chamber 403 would be maintained under reduced pressure (partial vacuum), to facilitate processes therein. Calcium compounds could also be injected with additional inert gas in the second chamber via line 421. The result of the aluminum, argon, calcium oxide, calcium fluoride insertion would be generation of steel, as previously described. Slag 425 floating on top of the steel product 426 could be removed via means such as slag tap 427 and, at the end of the process, steel could be readily removed via port 428. In the schematic of FIG. 4, additional argon lines 430 are illustrated, for chamber 403; and, additional oxygen line 431 is illustrated for chamber 401. Off gases could be readily removed from the system via lines 435 and 436. These off gases can be directed elsewhere in the process, for example to the steam generation plant for efficient use. At 440, heating coils are indicated. Aperture 441 in projection 442, allows for passage of slag. The projection 442 itself generates some mixing in the first chamber 402, to facilitate refining. In FIG. 5, a cross-section illustrating a trough-like configuration to arrangement 401 is shown.

It will be understood that while the multi-chamber refining units shown in FIGS. 3 and 4 include two chambers each, arrangements including more than 2 chambers may be provided, in accordance with many of the principles of this invention.

A typical process according to the present invention will be understood from the following proposed example.

Advantageous Arrangement for Conducting Stage 2 Under Pressure

In an advantageous arrangement, iron reduction is done under pressures greater than atmospheric pressure. The pressure of the gases represents substantial energy. This energy may be extracted to drive a high pressure gas turbine in Stage Three, thereby facilitating more efficient energy production. In an advantageous arrangement, reduction is effected under substantial pressure for enhanced reduction and for enhanced reduction and to obtain the benefit of pressurized output gases. The arrangement also decreases the pressure of the molten metal, overcoming the handling problems in a manner as described below.

Figure 6:
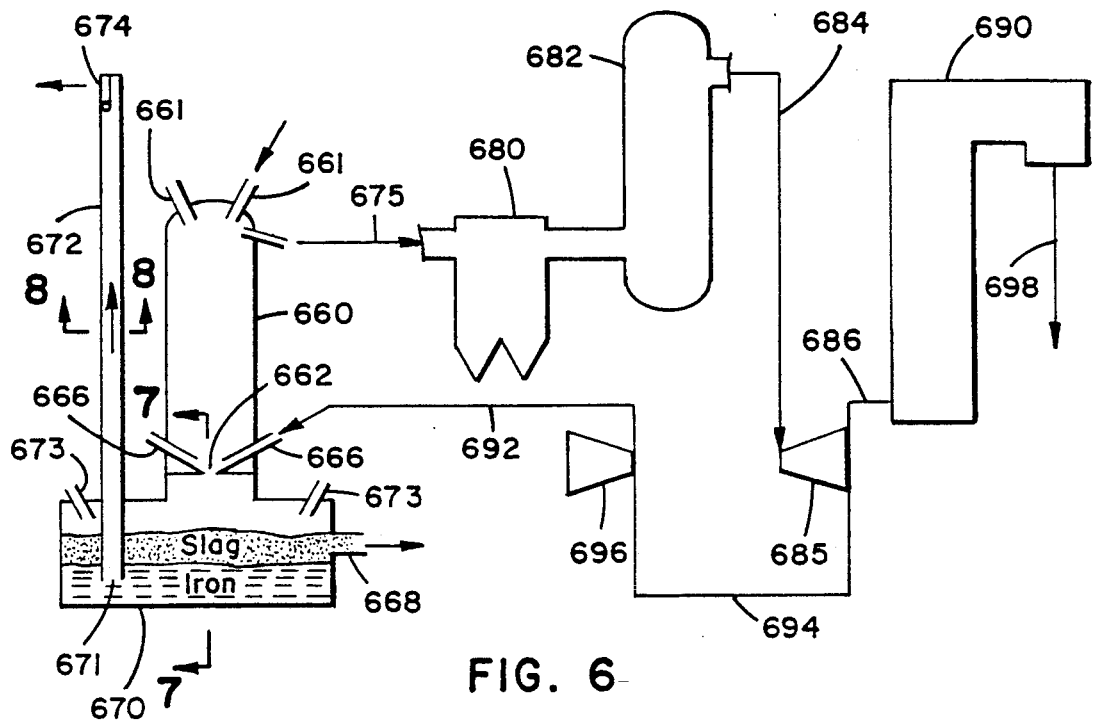
FIG. 6 is schematic representation of an embodiment of an iron reduction process under high pressure according to the present invention.

As shown in FIG. 6, feed stock is input to a pressurized copula 660 through lines 661. Operating pressures are at least 50 psia and in some applications preferably range from 250-300 psia, depending on the characteristics of the feed stock, temperature, and flow rate. The feed stock melts before flowing out tap hole 662 at a lower end of copula 660. Air for reduction is fed from a compressor 696 through line 692 and is forced into the copula 660 through tuyeres 666 above tap hole 662. The melted iron material then collects in a pool in a lower chamber 670 while still under pressure. The iron material may be further refined in lower chamber 670. Gases and/or minerals are introduced at inlets 673 to facilitate refinement. Slag forming on the surface is drawn off of the molten metal and disposed out line 668.

The remaining iron material passes up an inlet 671 of a vertical tap arrangement 672 comprising a conduit extending down into the molten iron so that the inlet 671 is submerged below the surface of the molten metal. The high pressure of the copula 660 forces the molten iron up the vertical tap arrangement 672. As the pressure forces the molten metal up vertical tap arrangement 672, the metal's weight counteracts the gas pressure. So that as the molten metal rises, the head pressure decreases. At an advantageous height, the weight of the metal has offset the head pressure, so that the molten metal may be tapped and relatively safely handled, thereby overcoming the problems associated with handling pressurized molten metal. For a copula operating at 250-300 psia, an outlet 674 will be at a height approximately 50 feet above the level of the molten iron in the copula lower chamber 670. However, the vertical tap arrangement 672 performs the same function at any pressure greater than atmospheric pressure. Varying height of the tap arrangement 672 adapts the arrangement to other pressures but the tap arrangement of 672 need not be adjustable if operated at a constant pressure. In one embodiment the outlet 674 is vertically adjustable for operation over a range of pressures, but other methods of varying height, such as removable conduit sections may be used.

Figure 8:
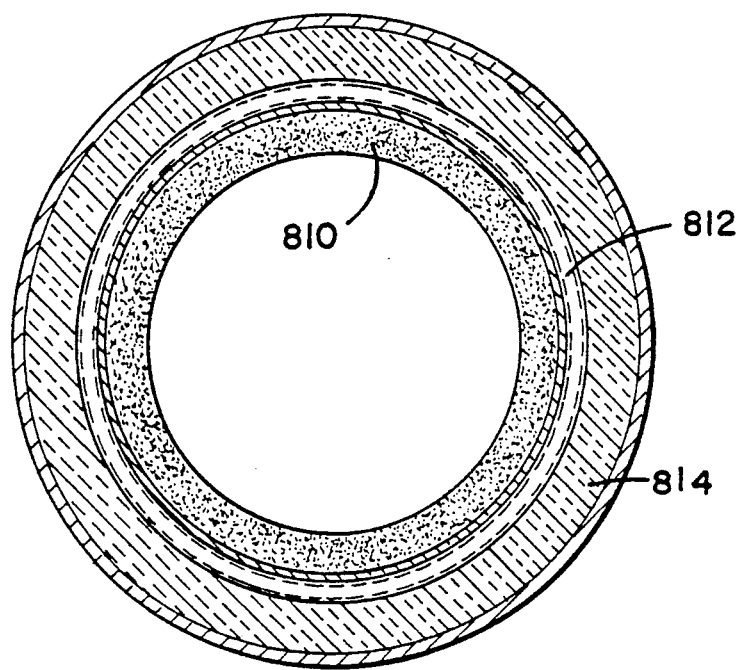
FIG. 8 is a sectional view of the vertical tap arrangement taken at line 8—8 of FIG. 6 according to the present invention.

In a preferred embodiment, the vertical tap arrangement 672 as shown in FIG. 8 has a refractory lining 810. The refractory 810 is advantageously encompassed by intermittently spaced heating coils 812 or other heating means. The tap arrangement 672 preferably includes an insulation layer 814, to maintain a temperature over 2,500° F. and prevent freezing of the molten metal. Upon reaching the top outlet 674 of the vertical tap arrangement 672, the molten iron is at approximately atmospheric pressure, and may be further refined as shown in FIGS. 3, 4 and 5.

Figure 7:
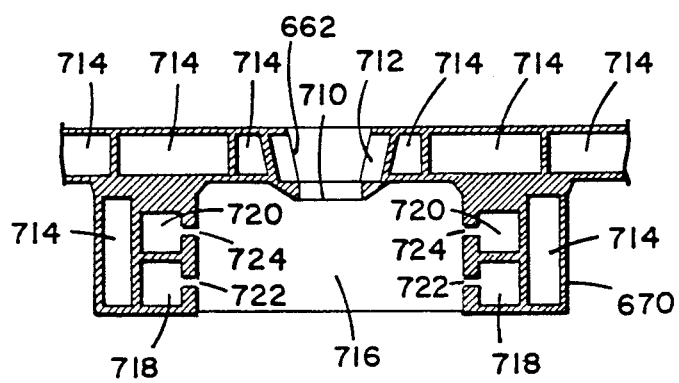
FIG. 7 is a sectional view of a bottom portion of a high pressure copula of an advantageous arrangement taken at line 7—7 in FIG. 6 according to the present invention.

FIG. 7 shows a cross-sectional view of the lower portion 670 of the copula 660 of FIG. 6. A lower ring 710 of the tap hole 662 is surrounded by cooling water in chambers 714. The molten iron passes through the lower ring 710 into a lower chamber 716. Oxygen from chamber 718 and methane from chamber 720 surrounding the lower chamber 716 pass through lines 722 and 724 respectively to aid in the refinement process. From the lower chamber 716, the iron may pass into the various other chambers for further refinement.

Referring again to FIG. 6, output gases under pressure greater than atmospheric pressure from copula 660 leave through line 675 to a filter 680 and sulfur removal chamber 682. The clean gas is then directed to a high pressure gas turbine 685 to produce electricity. The gas may then pass through a second turbine stage (not shown) and/or is further utilized in a boiler 690 to produce steam for further electricity production. The turbine 685 may also be used to drive compressor 696 for feeding pressurized gas to copula 660. Flue gas generated in the boiler 690 passes out the boiler 690 at 698.

EXAMPLE 1

The following provides a description of operation of a typical processing plant, on a scale which would generally be useful, according to the present invention. It will be understood that a variety of plant sizes, and operating conditions, may be utilized according to the principles described previously. For the example illustrated, it is envisioned that coal feed into the system will be on the order of about 79 tons per hour. From the extraction and pyrolysis, for a typical coal feed, about 31 tons per hour of oils and 21 tons per hour of volatile gases, can be released, resulting in formation of about 27 tons of char per hour.

Pelletization depends upon the nature of the iron to be reduced. If iron ore such as taconite is involved, about 13 tons per hour of the 27 tons per hour of the char should be hardened into pellets without the taconite, via steam induration as previously described, with sufficient water and lime being provided to facilitate pellet integrity. About 14 tons per hour of the char should be mixed with about 70 tons per hour of the iron ore, 4.5 tons per hour of lime, and 11.5 tons per hour of water, to form about 100 tons per hour of pellets. Typically, along with the steam induration process, a drying step may be utilized to drive moisture out of the pellets, resulting in about 90 tons per hour of ore-containing pellets being fed into the copula, with the copula also being fed with the 13 tons per hour of char which was pelletized without ore.

As previously indicated, the copula can be operated under a variety of conditions. For a typical run, about 116 tons per hour of combustion air should be driven into the copula, to form about 161 tons per hour of off gases, 18 tons per hour slag, and 40 tons per hour of reduced iron, i.e. pig iron, which can be readily converted to steel, as previously described.

The gases in the copula are rapidly cooling, as they pass through the material in the copula. However, these gases are reheated during the burning process, to a relatively high temperature. This permits efficient energy generation via the gas turbine, and the follow-up boiler/steam system. Generally, conventional equipment can be utilized to accomplish this.

It is to be understood that while certain embodiments of the present invention have been illustrated and described, the invention is not to be limited to the specific arrangements described herein, except as provided for by the following claims.

What is claimed and desired to be secured by Letters Patent is as follows:

1. A process for the production of electricity; said process including the steps of:
   (a) providing a low grade coal fuel;
   (b) performing a liquefaction procedure on the coal fuel to remove oil and volatiles therefrom, and to generate a resultant coal char product;
   (c) pelletizing the coal char product to form coal char product pellets, said step of pelletizing comprising pelletizing at least a portion of the coal char product in combination with reducible solid iron material to form coal char product pellets containing reducible solid iron material;
   (d) charging a copula with the coal char product and the reducible solid iron material, said step of charging a copula being characterized by charging substantially all the coal char product in the form of coal char product pellets and substantially all the reducible solid iron material in the form of pellets containing the coal char product in combination with the reducible solid iron material;
   (e) reducing and melting substantially all the reducible solid iron material in the coal char product pellets by heating the pellets in the copula at a suitable temperature under a pressure of at least about 100 psia in the presence of a sufficient upward flow of process gases, with the resultant formation of reduced molten iron material and hot product gases having pressures greater than atmospheric pressure;
   (f) lowering a head pressure of the reduced molten iron material from the pressure maintained in said reducing and melting step to near atmospheric pressure; said step of lowering head pressure being conducted contemporaneously with continued melting and reducing of the reducible solid iron material in step (d);
   (g) tapping the high pressure hot product gases from an upper portion of the copula;
   (h) directing the high pressure hot product gases downstream to electrical production equipment; and,
   (i) producing electricity from the hot product gases having pressures greater than atmospheric pressure.

2. The process according to claim 1 wherein said step of lowering head pressure of the reduced molten iron material includes a step of using the pressure to force the iron material up a vertical tap arrangement, so that the head pressure decreases as the reduced molten iron material rises, thereby lowering the head pressure upon rising to an outlet of the vertical tap arrangement.

3. The process of claim 2 wherein said step of lowering head pressure further includes heating the vertical tap arrangement to maintain the reduced molten iron material in a free flowing state.

4. The process according to claim 3 wherein said step of liquefaction comprises an extraction of said coal fuel with a solvent, followed by a pyrolysis procedure.

5. The process according to claim 4 wherein:
   (a) said solvent is selected from the group comprising water and organic phenols; and,
   (b) said pyrolysis comprises treatment of extracted coal fuel at a temperature of about 600° C. or less to drive volatiles therefrom.

6. The process according to claim 1 wherein the coal char product from step (b) is used as activated carbon in water treatment; and, following said use, the char is utilized in step (c).

7. The process according to claim 1 further including utilizing heat derived from the high pressure hot product gases in the performance of steps (b) and (e) to achieve a thermally efficient process.

8. The process according to claim 1 wherein said step of reducing and melting the reducible solid iron material is conducted at a pressure of at least about 125 psia.

9. The process according to claim 1 wherein said step of reducing and melting the reducible solid iron material is conducted at a pressure of at least about 250 psia.

10. The process according to claim 1 wherein said step of reducing and melting the reducible solid iron material is conducted at a temperature of at least about 2,400° F.

11. The process according to claim 10 wherein said step of reducing and melting the reducible solid iron material at a temperature of at least about 2,400° F. is conducted at a pressure of at least about 125 psia.

12. The process according to claim 1 wherein said step of producing electricity from the high pressure hot product gases includes passing the high pressure hot product gases through a high pressure gas turbine to generate electrical power and then through a boiler to generate steam; at least a portion of the steam being utilized to drive a turbine and generate electrical power.

13. The process according to claim 12 wherein said step of pelletizing the coal char product includes mixing the coal char product with a binder selected from the group consisting of burned lime, silica, water, and mixtures thereof to form pellets.

14. A process for the production of electricity; said process including the steps of:
   (a) providing a low grade coal fuel;
   (b) performing a liquefaction procedure on the coal fuel to remove oil and volatiles therefrom, and to generate a resultant coal char product;
   (c) pelletizing the coal char product to form coal char product pellets, said step of pelletizing comprising pelletizing at least a portion of the coal char product in combination with reducible solid iron material to form coal char product pellets containing reducible solid iron material;
   (d) charging a copula with the coal char product and the reducible solid iron material; said step of charging a copula being characterized by charging substantially all the coal char product in the form of coal char product pellets and substantially all the reducible solid iron material in the form of pellets containing the coal char product in combination with the reducible solid iron material;

(e) reducing and melting substantially all the reducible solid iron material in the coal char product pellets by heating the pellets in the copula at a suitable temperature under a pressure of at least about 100 psia in the presence of a sufficient upward flow of process gases, with the resultant formation of reduced molten iron material and hot product gases having pressures greater than atmospheric pressure;

(f) lowering a head pressure of the reduced molten iron material from the pressure maintained in said reducing and melting step to near atmospheric pressure by using the pressure to force the reduced molten iron material up a vertical tap arrangement, so that the head pressure decreases as reduced molten iron material rises, thereby lowering the head pressure upon rising to an outlet of the vertical tap arrangement;

(g) tapping the reduced molten iron material from the outlet of the vertical tap arrangement;

(h) tapping the high pressure hot product gases from an upper portion of the copula;

(i) directing the high pressure hot product gases downstream to electrical production equipment; and, (j) passing the high pressure hot product gases through a high pressure gas turbine to generate electrical power and then through a boiler to generate steam; at least a portion of the steam being utilized to drive a turbine and generate electrical power.

15. The process of claim 14 wherein said step of lowering head pressure further includes heating the vertical tap arrangement to maintain the reduced molten iron material in a free flowing state.

16. The process according to claim 14 wherein the coal char product from step (b) is used as activated carbon in water treatment; and, following said use, the char is utilized in step (c).

17. The process according to claim 14 wherein said step of performing a liquefaction procedure comprises performing a pyrolysis procedure at a temperature of about 600° C. or less to drive volatiles therefrom.

18. The process according to claim 14 further including utilizing heat derived from the high pressure hot product gases in the performance of steps (b) and (e) to achieve a thermally efficient process.

19. The process according to claim 14 wherein said step of reducing and melting the reducible solid iron material is conducted at a pressure of at least about 125 psia.

20. The process according to claim 14 wherein said step of reducing and melting the reducible solid iron material is conducted at a pressure of at least about 250 psia.

* * * * *